(12) United States Patent
Abel et al.

(10) Patent No.: US 7,630,585 B2
(45) Date of Patent: Dec. 8, 2009

(54) IMAGE PROCESSING USING UNALIGNED MEMORY LOAD INSTRUCTIONS

(75) Inventors: James C. Abel, Phoenix, AZ (US); Brad D. Hinkle, Chandler, AZ (US); Nikolay Degtyarenko, Nizhny Novgorod Region (RU)

(73) Assignee: Intel Corporation, Santa Clara, CA (US)

( * ) Notice: Subject to any disclaimer, the term of this patent is extended or adjusted under 35 U.S.C. 154(b) by 912 days.

(21) Appl. No.: 10/876,423

(22) Filed: Jun. 25, 2004

(65) Prior Publication Data

US 2005/0286633 A1 Dec. 29, 2005

(51) Int. Cl.
G06K 9/54 (2006.01)
(52) U.S. Cl. .................. 382/303; 382/254; 707/201; 395/386; 395/825
(58) Field of Classification Search .................. 382/303, 382/254
See application file for complete search history.

(56) References Cited

U.S. PATENT DOCUMENTS

| | | | |
|---|---|---|---|
| 5,019,903 A * | 5/1991 | Dougall et al. ............. | 348/448 |
| 5,519,842 A | 5/1996 | Atallah et al. | |
| 6,405,233 B1 | 6/2002 | Mathews et al. | |
| 6,449,706 B1 | 9/2002 | Chen et al. | |
| 6,721,866 B2 * | 4/2004 | Roussel et al. ............. | 711/201 |
| 6,885,705 B2 * | 4/2005 | Arita et al. ............. | 375/240.16 |
| 7,272,622 B2 * | 9/2007 | Sebot et al. ................. | 708/200 |
| 2002/0041631 A1 * | 4/2002 | Arita et al. ............. | 375/240.16 |
| 2003/0120889 A1 * | 6/2003 | Roussel et al. ............. | 711/201 |
| 2003/0123748 A1 * | 7/2003 | Sebot et al. ............. | 382/254 |
| 2003/0131030 A1 * | 7/2003 | Sebot et al. ................. | 708/209 |
| 2005/0089100 A1 * | 4/2005 | Arita et al. ............. | 375/240.16 |
| 2005/0177673 A1 * | 8/2005 | Oberlaender ................. | 711/3 |

OTHER PUBLICATIONS

"Block-Matching In Motion Estimation Algorithms Using Prescott New Instructions and Streaming SIMD Extensions 2", Intel®—Version 1, Aug. 2003.
"Block-Matching In Motion Estimation Algorithms Using Streaming SIMD Extensions 3", Version 2, Dec. 2003, Copyright Intel Corporation 2002, 2003.

* cited by examiner

Primary Examiner—Samir A. Ahmed
Assistant Examiner—Tsung-Yin Tsai
(74) Attorney, Agent, or Firm—Blakely, Sokoloff, Taylor & Zafman LLP (57) ABSTRACT

Pixel values of an image are loaded into main memory and cache of a computer system. Two different instructions are used to load pixel values of the image from the cache to a set of registers in a processor of the system. A first one is used when loading an operand (containing pixel values) that is aligned with a cache line boundary of the cache. A second instruction is to be used when loading an operand (containing pixel values) that is not aligned with the cache line boundary. The second instruction can execute a cache line split without a significant performance penalty relative to execution of the first instruction. Other embodiments are also described and claimed.

12 Claims, 4 Drawing Sheets

IMAGE PROCESSING USING UNALIGNED MEMORY LOAD INSTRUCTIONS

BACKGROUND

An embodiment of the invention is directed to digital image processing by a system having a processor and memory.

In digital image processing, natural scenes and artificially created ones (such as those created by computer graphics systems) are represented by digital images. An image includes a collection of picture elements (pixels) each of which is a set of numbers that may represent the intensity and/or color of a particular location on a display screen. A typical digital image may have upwards of one million pixels. To display an image, each pixel is translated into control signals that are then applied to activate a corresponding location of a display screen. In the case of video, a sequence of images or frames are rapidly processed and displayed sequentially at a high enough rate (e.g., greater than 20 frames per second) to show motion in the scene.

A typical hardware/software platform for digital image processing may be a personal computer, or other electronic system, that has the following primary hardware components: a central processing unit (CPU) or host processor, such as a PENTIUM processor by Intel Corp., Santa Clara, Calif.; a graphics controller, such as one that is integrated within and is a display adapter component of a system chipset (e.g., the 865G chipset by Intel Corp.); and main memory (also referred to as system memory) composed of for example dynamic random access memory (DRAM). The graphics controller is a specialized integrated circuit that performs various types of compute-intensive digital image processing upon image data.

The software may be loaded into main memory once the system has been booted, to be executed by the host processor. This software may include an application program such as digital video disc (DVD) player software, an operating system program, and a device driver that is used by the application program for accessing hardware registers of the graphics controller. Once the hardware has been configured by the operating system and driver, the application program can execute.

Systems such as desktop and notebook computers are being put to task with current digital image processing applications such as motion picture experts group (MPEG) video file creation and playback. Such software applications place relatively high demands on the processor and memory, due to their use of complex video encoding and decoding algorithms upon high-resolution images. This often results in relatively slow performance. A reduction in the total amount of time needed to create the compressed video file can be obtained, by running the same software on a system whose processor has a higher clock frequency.

BRIEF DESCRIPTION OF THE DRAWINGS

The embodiments of the invention are illustrated by way of example and not by way of limitation in the figures of the accompanying drawings in which like references indicate similar elements. It should be noted that references to "an" embodiment of the invention in this disclosure are not necessarily to the same embodiment, and they mean at least one.

DETAILED DESCRIPTION

An embodiment of the invention is directed to the use of a processor having an instruction set architecture (ISA) that supports a fast, unaligned memory load instruction to significantly improve the performance of heavy digital image processing tasks, such as the block matching portion of a motion estimation search in video encoding. Before describing some example video encoding applications, a system architecture or mode of operation of a processor and memory system are described. Beginning with FIG. 1, a block diagram of a system that may be part of a desktop or notebook computer is shown. The system has a processor 10 which may have a super scaler, pipelined architecture such as a PENTIUM® 4 processor by Intel Corp., of Santa Clara, Calif. The processor 10 may be a processor code named Prescott by Intel Corp. that supports Prescott New Instruction (PNI) technology for IA-32 Intel processor architectures. This capability accelerates the performance of streaming single instruction multiple data, SIMD, extensions (SSE) 3 technology over earlier generations of the PENTIUM® 4 processor. It has been discovered that a new processor instruction introduced in the PNI/SSE 3 technology significantly improves the performance of a certain digital image processing application, namely that of video encoding that uses block matching in a motion estimation search algorithm. Additional details about an embodiment of the processor 10 can be found in U.S. Patent Application Publication No. US 2003/0120889 A1 of Roussel, et al. (assigned to the same assignee as that of this application).

Figure 1:
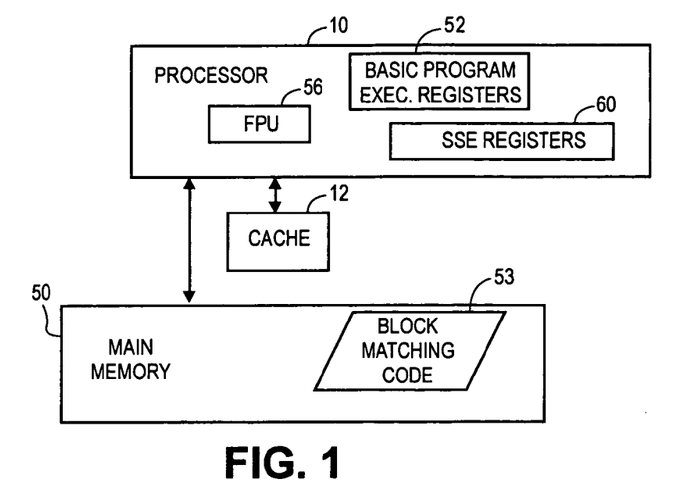
FIG. 1 shows a block diagram of a system that may be part of a desktop or notebook computer.

The processor 10 has a set of basic program execution registers 52, a floating-point unit (FPU) 56 that has a set of floating-point data registers (not shown), and a set of SSE/SIMD registers 60. The registers and floating-point unit are the resources that make up an execution environment for a program or task running on the processor 10. The program or task is given such a set of resources for executing instructions and for storing data and processor state information. An application program and the operating system or executive that is running on the processor 10 uses this execution environment jointly. Note that there are several fundamental data types that are referenced as instruction operands that are stored in either a main memory 50 or cache 12 of the system shown. The data type sizes used in the processor 10 are byte (8-bits), word (e.g., 2-bytes or 16-bits), double word (4-bytes or 32-bits), quad word (8-bytes or 64-bits), and double quad word (16-bytes or 128-bits).

The basic program execution registers 52 have several general purpose registers that are used for executing general purpose instructions. Such instructions may perform basic integer arithmetic on byte, word, and double word integers, as well as perhaps handle program flow control, operate on bit and byte lengths, and address the main memory 50. In contrast, the FPU 56 has several FPU data registers, an FPU control register, a status register, an FPU instruction pointer register, an FPU operand (data) pointer register, an FPU tag register, and an FPU op-code register (not shown). These registers provide an execution environment for operating on single precision, double precision, and double extended precision floating-point values. In addition, they may operate on integers that are word, double word, and quad word length, as well as binary coded decimal values.

The SSE/SIMD registers 60 provide an execution environment for performing SIMD operations on, for example, quad word, 128-bit single precision and double precision floating-point values, and on 128-bit packed byte, word, double word, and quad word integers.

As mentioned above, the main memory 50 is to store data that is to be accessed by the processor to implement, for example, a higher level software application such as a video encoder that uses block matching code 53. Main memory 50 may consist of dynamic random access memory (DRAM) modules that are accessed by a memory controller (not shown). The memory controller may be integrated with the processor in the same integrated circuit package, or it may be part of a system interface (chipset) package. The memory controller may translate virtual addresses received from the processor as part of a memory request (read or write) into physical addresses of the DRAM modules. The main memory will also be used to store the pixels that are part of one or more image frames being processed.

Any data in memory 50 that is frequently used by the processor 10 may be temporarily stored in the cache 12 for faster access by the processor. The cache 12 may be arranged as cache lines, with a function that may restrict where, i.e. in which cache lines, a memory block is placed. For example, each memory block may be allowed to appear in only one place of the cache. This is referred to as a direct-mapped cache. If a block can be placed anywhere in the cache, the cache is said to be fully associative. If a block can be placed in a restricted number of places, the cache is said to be set associative. A set may be a group of cache lines; a block is first mapped into a set, and then it can be placed anywhere within that set. If there are n blocks in a set the cache placement is called n-way set associative.

Note that there may be multiple levels of cache between the processor and the main memory 50, although in the embodiments described below, the cache 12 is the one that is closest to the processor 10. As an example of the relative size of the cache and main memory, the first level cache may be 32-kilobytes whereas the main memory may be several hundred megabytes. A secondary cache, if used, may be on the order of several hundred kilobytes.

Operation of the unaligned memory load instruction in the context of the system described above will now be described. The instruction may specify a register such as one of the SSE/SIMD registers 60 to be the destination of an operand whose location may be given by a virtual address specified in the instruction. Such an instruction would appear, for example, following the compiling of high level source code for a video encoder. Alternatively, as explained below using an example, the instruction may be inserted into the source code as part of a section of specialized assembly language code or intrinsic code that implements the block matching portion of the motion estimation search algorithm. In both cases, the instruction arrives at the processor 10 from main memory 50 and may be decoded into micro operations (uops) that individually are used to, for example, fetch the specified operand from memory and store that fetched operand in the specified register.

Figure 2:
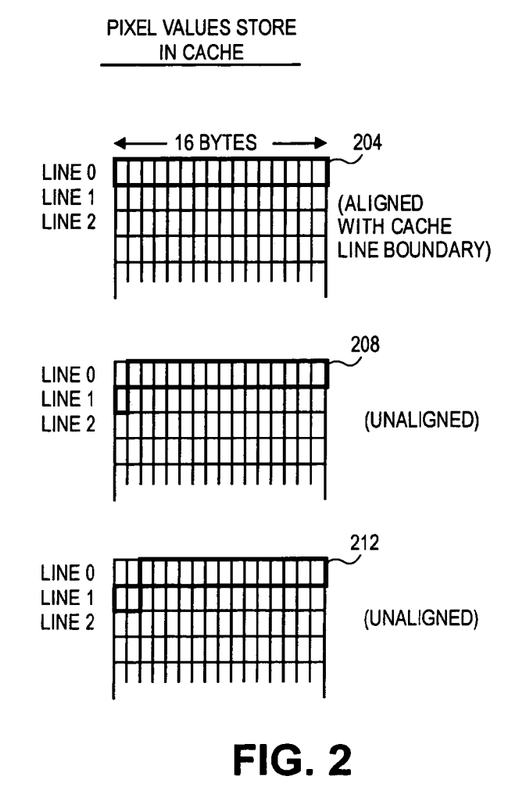
FIG. 2 illustrates how operands that contain pixel values may be stored, aligned and unaligned, in cache.

Referring now to FIG. 2, this figure shows examples of unaligned quad word operands in cache. The first operand 204 in this example consists of a single quad word or 16-byte block that is aligned with a 16-byte cache line boundary. The cache line boundary in this example is 16-bytes in the sense that each line of the cache is exactly 16-bytes wide, where transfers from memory to the cache and from the cache to a register of the processor occur in integral quantities of one or more lines at a time. Note that the processor may also transfer blocks with finer granularity, e.g. smaller than 16-bytes each. For example, certain instructions are designed to transfer blocks of 1-byte each. In this example, however, the fine granularity transfer is not needed since the operand is aligned with the 16-byte line boundary, and a single transfer from memory that involves line 0 of the cache is sufficient to load the operand into its register.

On the other hand, for the operand 208, a single transfer of line 0 is insufficient because the operand 208 straddles two contiguous cache lines 0 and 1, as shown. This is an example of an unaligned memory operand. Another unaligned example is the operand 212.

Figure 3:
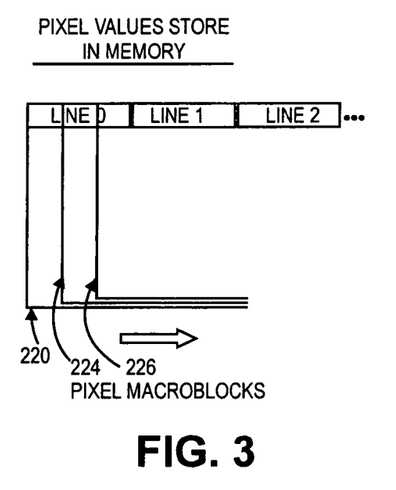
FIG. 3 illustrates how operands containing pixel values may be mapped for storage in main memory.

Unaligned operands may occur for various reasons in many applications. For the example of video encoding to be further described below, the unalignment in the operands 208, 212 results from the shifting of pixel macro blocks used in a block matching algorithm. FIG. 3 illustrates an example of how pixel values in the cache lines are arranged as part of macro blocks in main memory. To load the initial pixel macro block 220, an initial, aligned transfer from memory to cache is performed, which includes operand 204 (FIG. 2). The next pixel macro block 224, however, includes the unaligned operand 208, which results from the macro block 220 having been shifted to the right by one pixel. Similarly, for the next pixel macro block 226, the operand 212 is unaligned.

According to an embodiment of the invention, a processor instruction set architecture (ISA) is used in digital image processing software, where the ISA has two different load instructions. A first one is used in the software for loading pixel values that are aligned with a cache line boundary. A second instruction is to be used when loading pixel values that are not aligned with the cache line boundary. This second instruction executes what is referred to as a cache line split where, referring now to the examples in FIG. 2, its operand 208 or 212 is loaded from the cache by loading both line 0 and line 1 into registers in the processor, followed by an extraction operation where the correct operand (highlighted) is extracted from the two cache lines that have been loaded. As implemented in PNI/SSE 3 technology, such an instruction executes the cache line split without a significant performance penalty relative to execution of the first instruction, where the first instruction may be one that transfers one line of cache at a time, aligned with a cache line boundary. A "significant performance penalty", as used here, refers to taking more than, for example, five clocks longer to retire the instruction that loads the unaligned operand, as compared to the one that loads an aligned operand. This handling of the cache line split in processor hardware is particularly effective for use with algorithms that call for a large number of memory loads whose operands are unaligned with a cache line boundary. A special case addressed here is that of video encoding software, and particularly the block matching algorithm.

Video Encoding Software

The example of a block matching algorithm is part of a motion estimation search used in typical video encoding applications, such as MPEG and MPEG2 encoders. In video encoding, information compression may be achieved by first noting that consecutive frames of video are often times nearly identical. These differences are typically made up of blocks of pixels that move around the frame from one image frame to the next, in a generally orderly manner. For example, consider a video of a tennis match: the majority of the pixels that define motion in the scene involve the players and the ball. The pixels that represent these objects slide back-and-forth from one frame to the next, however, they do not change significantly. In other words, the ball still looks like a ball; it is only different in position from one frame to the next. Accordingly, instead of storing compressed versions of the pixel blocks that represent these moving objects, a motion vector is created and stored instead. The motion vector simply points to the location within the next frame of a particular block of pixels. For example, if a 16×16 pixel block has moved two pixels left and one pixel down in the next frame, it is more efficient to store this information as a vector, than to store the compressed data for the new 16×16 block.

Implementing the Block Matching Algorithm

Figure 4A:
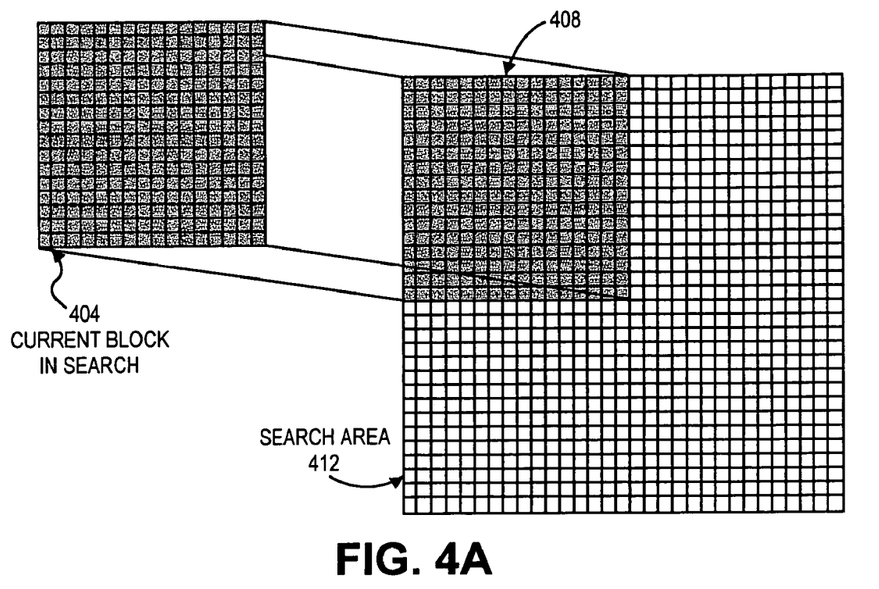
FIGS. 4A-4B illustrate selected reference blocks being compared, pixel by pixel, with the current block, in a block matching algorithm.
Figure 4B:
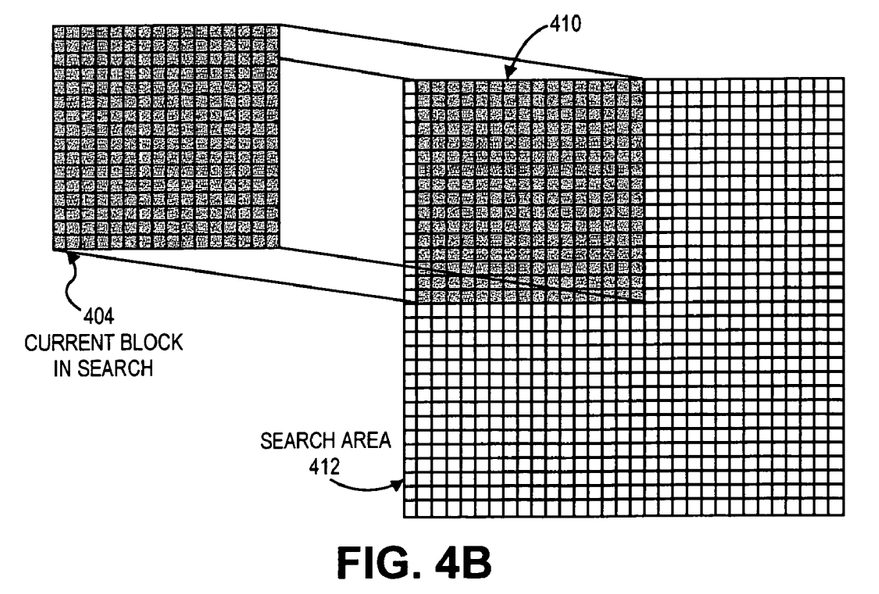

Typically, a block matching algorithm is embedded into a motion estimation search algorithm. Referring now to FIGS. 4A-4B, this algorithm searches for the closest match to a current pixel block 404 from a number of reference pixel blocks 408 that are in a given search area 412 of another image frame. A motion vector based on the closest match is then defined, to indicate the next location of the current block in the next frame. The search may be done in several different ways, although a relatively easy to implement one would be a full search. In that case, an exhaustive comparison between a current block 404 and all possible reference pixel blocks in a search area 412 of the next image frame is performed. As depicted in FIG. 4A, each block comparison is a pixel by pixel comparison, such that for each 16×16 block, about 256 pixel comparisons are performed. A selected reference block 408 is compared at a starting point, pixel by pixel, with the current block 404. The reference block is then moved or shifted over by a single pixel (FIG. 4B), and compared against the same current block 404. This continues through the search area 412 until the closest match to the current block is found.

The best match may be determined in several different ways. For example, a difference between corresponding pixels of the current block and the reference block is formed, and this absolute difference is accumulated for each reference block. This sum of absolute differences (SAD) gives a numeric value for the relative degree of difference or match between the two blocks. The smaller the SAD value, the better the block match. Other ways of determining the best match is to use a sum of squared differences (SSD) where once again the lowest value of SSD obtained for the search area 404 may be considered to indicate the best match.

FIG. 4B illustrates how the next reference block 410 is determined. The current block 404 remains unchanged, while the new reference block 410 is the previous block 408 but shifted horizontally by a single pixel. Note that in such a technique, there is significant overlap between each pair of current-reference blocks being compared, even though as a whole, different pixels are compared in each case. This comparison process repeats through the entire search range or selected area, although it some times may be interrupted if the code provides for an early termination due to an indication that the current block is not likely to be in the search area. For example, this may occur if the SAD values across several reference blocks that have been searched is above a predetermined threshold, indicating that the current block is probably not in the search area. However, in other embodiments, the comparison process is forced to complete the entire search area, so as to avoid a potential branch misprediction penalty that is associated with conditional branch instructions that would be needed to implement the early termination scheme. Accordingly, the search may easily add up to millions of cycles as two arrays of 256 values are compared 256 times. In addition, this search may need to be repeated for each pixel block in a particular image frame, such that, for example, if the frame is 720×480 pixels, 45×30=1,350 blocks may need to be subjected to the block matching algorithm. Accordingly, it has been determined that motion estimation uses a large part, if not a majority, of the execution time of a software video encoder.

Improving Performance of the Motion Estimation Algorithm

Typically, the motion estimation algorithm may be enhanced by reducing the number of block comparisons. Techniques such as sub-sampling, algorithmic searches, and telescopic searches may be used to improve the efficiency of the encoder, by reducing the number of block comparisons. This, of course, should be done keeping in mind that acceptable video quality needs to be maintained. Further enhancement of the video encoder may be achieved by using SSE technology as introduced with the PENTIUM® III processors by Intel Corp. For example, the PSADBW instruction compares 8-bytes from each of the two pixel blocks at once, returning a single SAD value. This type of single instruction multiple data operation replaces eight subtractions and accumulations, as well as handling an absolute value determination without the use of branches. This particular modification may have produced an improvement in performance of about 1.7 times over an MMX technology implementation on a PENTIUM® III processor.

An early return threshold may also be implemented within a block comparison. If, after a certain number of rows of two blocks have been compared, and a current accumulated SAD value is above a predetermined threshold, then the block matching algorithm is aborted. This may be effective in situations where it is not practical to keep comparing subsequent reference blocks to a current block, if the reference blocks are very different than the current block. However, it often takes longer to decide when to exit the algorithm because a branch mispredict penalty is suffered, than to complete the block matching function for a particular block. As the frequency of the processor clock increases, branch misprediction recovery times have typically become longer. As a result, the value of the early return/termination may be on the decline for future processors, and may be a substantial detriment to motion estimation performance.

Using the LDDQU Instruction

Since, as described above, the search moves across a frame by shifting the reference block by, for example, one pixel at a time, this causes many cache line splits when executing a block matching algorithm. The cache line split occurs quite often, whenever an operand (which consists of a group of pixels) straddles or resides on two or more cache lines rather than a single one. To load such an operand, the processor may have to load two entire cache lines instead of one, and in addition may suffer a further time delay in handling this special access in hardware, that is extracting the operand from the two cache lines. However, according to an embodiment of the invention, with the LDDQU instruction provided with PNI technology and SSE 3 technology by Intel Corp., the penalty that may have been associated with a cache line split processed by a MOVDQU instruction (move double quad word, unaligned, provided in the processor ISA of early generation PENTIUM® 4 processors) is avoided. The ISA of processors that have PNI technology is an example of an instruction set architecture which has both of these instructions, namely one that is for use with aligned operands and another that is for use with unaligned operands.

The performance improvement obtained for block matching algorithms that use LDDQU for 16-byte unaligned transfers from memory and/or cache is significant in comparison to implementing a similar algorithm with an older instruction, such as one designed in SSE 2 technology. In addition to the avoidance of penalty due to cache line splits (using LDDQU), the performance improvement is further enhanced by using a larger cache, albeit with a slower access. This combination of LDDQU and a larger first level cache (closest to the processor) resulted in a substantial improvement in the performance of a block matching algorithm shown in the attached appendix. This may be explained by the following observation. Since the block matching algorithm uses a relatively large amount of memory, and repeatedly thrashes the cache (particularly in the case where a frame is as large as 720×480 pixels), the algorithm needs relatively high bus bandwidth (e.g., between the processor and cache). It was determined that using prefetched instructions to load the processor with instructions and operands in advance of their execution provided no substantial improvement in performance. That may be because a prefetch tends to displace higher priority loads into the processor. In addition, the time spent in calculations by the block matching algorithm is relatively low compared to the number of loads into the processor. In that case, it was determined that prefetches are not suitable. With the LDDQU instruction, however, a significant performance improvement was observed. See Application Note entitled "Block-Matching in Motion Estimation Algorithms Using Prescott New Instructions and Streaming SIMD Extensions", Version 1, August 2003, and Version 2, December 2003, published by Intel Corp.

An observation as to why the LDDQU instruction avoids the penalties associated with cache line splits suffered by earlier types of instructions, such as MOVDQU, is that LDDQU does not use a high latency function block (as used by MOVDQU for instance) to combine portions of two cache lines into a single operand.

The LDDQU instruction may be implemented by a low latency function block, in the following manner. The data items from two cache lines (in this case the entire contents of each cache line) are loaded using micro operations into a register storage area associated with the floating-point unit (FPU) 56 (see FIG. 1). Each of the data items is then shifted by appropriate amounts (determined based on the address of the operand) using a shifter that is also used for floating-point functions. The shifted operands are then combined to form the resulting operand that will then be stored in the SIMD register specified in the LDDQU instruction. Thus, for the example of operand 208, shown in FIG. 2, FIG. 5 illustrates a process for executing an unaligned load instruction.

Figure 5:
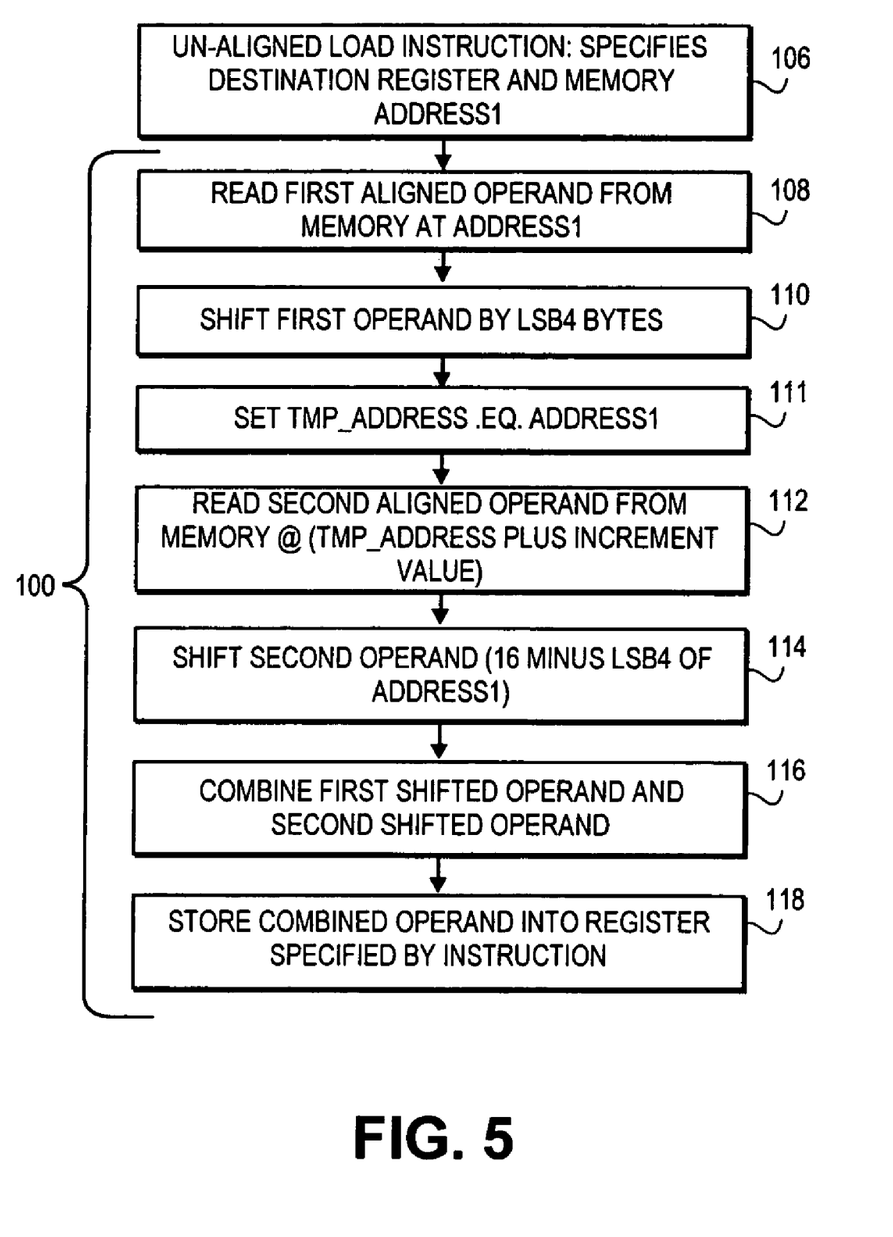
FIG. 5 illustrates a process for executing an unaligned load instruction.

Referring to FIG. 5, a process 100 is shown. Process 100 corresponds to an unaligned load instruction 106 that specifies a destination register for storing an aligned operand and also specifies a memory address of an unaligned operand. Process 100 reads 108 a first aligned operand from memory at ADDRESS1, and shifts 110 the first operand by a number of bytes equal to LSB4 of ADDRESS1. Process 100 sets (iii) TMP_ADDRESS equal to ADDRESS1, reads 112 a second aligned operand from memory at an incremented TMP_ADDRESS, and shifts 114 the second operand by a number of bytes equal to 16 minus LSB4 of ADDRESS1. Process 100 combines 116 the first shifted operand and the second shifted operand, and stores 118 the combined operand into the register specified by the unaligned load instruction.

Usage Models

Figure 6:
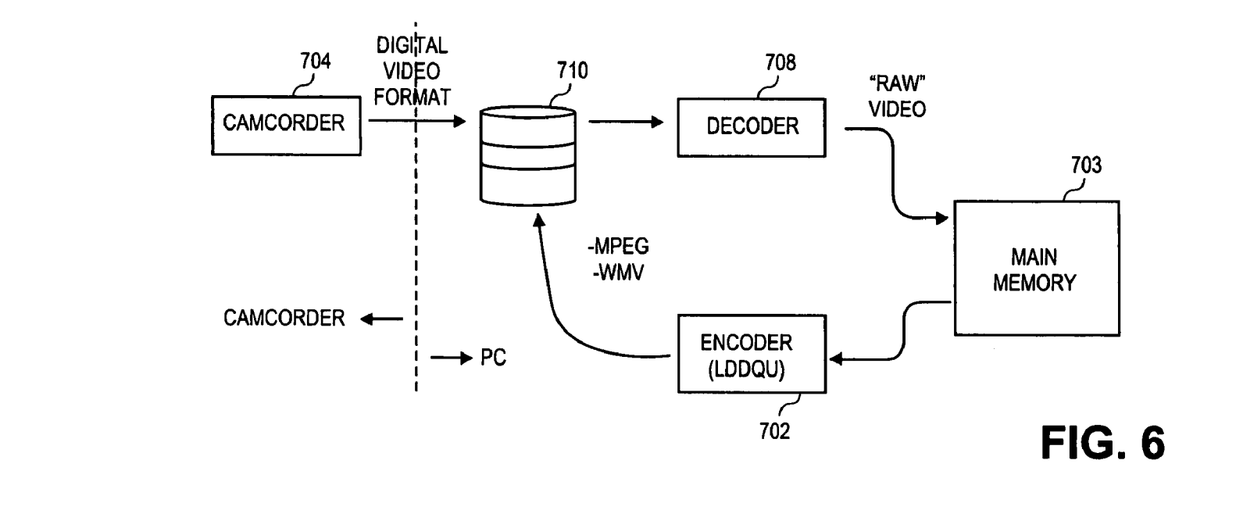
FIGS. 6 and 7 depict several possible usage models of a software video encoder.
Figure 7:
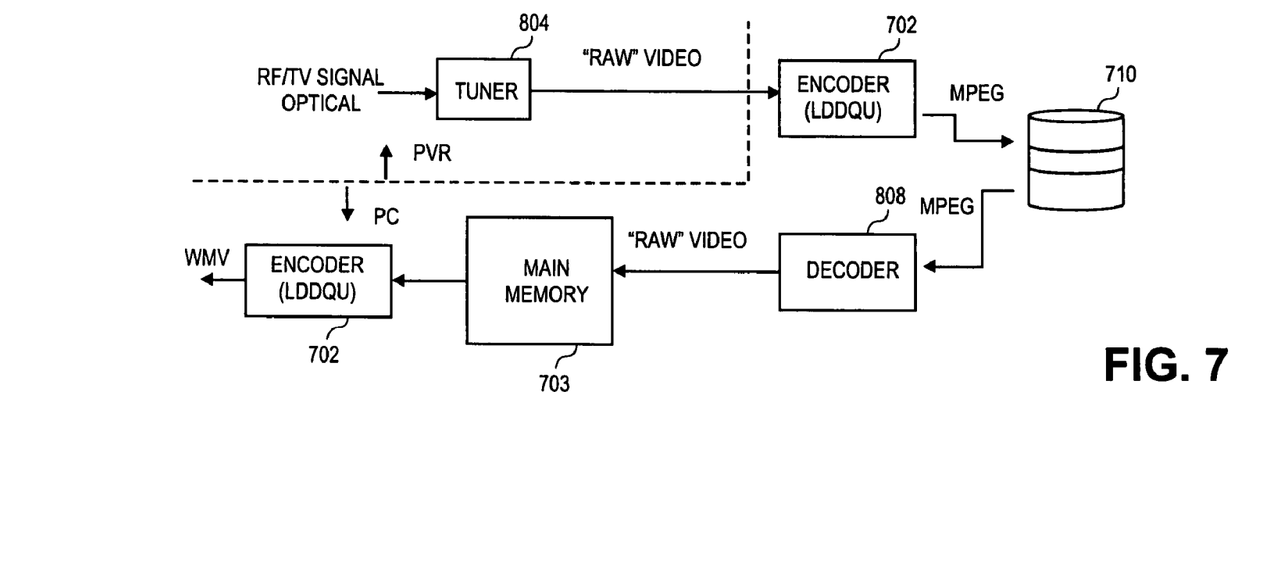

FIGS. 6 and 7 depict several possible usage models of the software video encoder embodiment described above, featuring an LDDQU or equivalent unaligned load instruction. In FIG. 6, an encoder 702 is used to used to compress raw video into a compressed format such as MPEG or Windows Media Video (WMV). The encoder 702 may be implemented as application software loaded into a desktop or notebook personal computer having a main memory 703. The raw video was written to the main memory 703 by a software decoder 708. This decoder 708 performs the appropriate decoding from a digital video format into the raw video format. A non-volatile mass storage device 710, such as a magnetic hard disk drive typically used in desktop and notebook personal computers, may be used to receive and store the video in the digital video format from a camcorder 704.

Turning now to FIG. 7, a personal video recorder (PVR) usage model is depicted, where raw digital video arrives from a tuner 804 that processes an input radio frequency/optical television signal. The raw video is then processed by an encoder that may feature the LDDQU instruction, into, in this example, MPEG format. The MPEG formatted video file is then stored in the non-volatile mass storage device 710. In some embodiments, a transcoding operation is desirable, where the user of the PVR may wish to change the format of the stored video file. In that case, a decoder 808 reads the MPEG formatted video file and produces raw video that is once again written to the main memory 703 of the desktop or notebook personal computer. Once again, the encoder 702 may be used to transform this raw video, that is compress it into a different format, such as WMV.

The invention is not limited to the specific embodiments described above. For example, although two usage models have been explicitly shown in FIGS. 6 and 7 for video encoding, the improved unaligned load instruction may also be used in other applications where a cache line split occurs frequently, to improve the performance of the application. Such examples include a database program that might generate read requests to memory that refer to operands that are not aligned with a cache line boundary. In addition, the cache line size of a double quad word and the load sizes of 128-bit operands may both be modified to perform loads from cache or memory that have different sizes. With different load sizes, the shift amount to be applied to extract the desired operand in the event of a cache line split could be determined by using fewer or greater number of the least significant bits of the address specified in an unaligned load instruction. Accordingly, other embodiments are within the scope of the claims.

| 5 C/C++ Coding Example |
|---|

```
// SAD-based block matching procedure for single macroblock
// Search area is sepcified by iLeft, iTop, iRight, iBottom.
// Result is returned through piMvPos.
// ARG: pucRef            Reference frame left top pointer.
//      pucCur            Current frame left top pointer.
//      piMvPos           Pointer of position indicated by result MV.
//      iWidth            Width of the frame.
//      iLeft             Search area left position.
//      iRight            Search area right position.
//      iTop              Search area top position.
//      iBottom           Search area bottom position.
//      iHpos             Current block left position in the frame.
//      iVpos             Current block top position in the frame.
// Comment:
//    MV 1 means 1pel
//    Not check validity of search area.
     iDown = iWidth – 16;
     /* Set start point for Refrence and Search window */
     pucCurLeftTop = pucCur + (iVpos * iWidth) + iHpos;
     /* Matching loop */
     for(iY = iTop; iY <= iBottom; iY++) {
     /* Set start point for Refrence and Search window */
```

-continued

5 C/C++ Coding Example

```
        pucRefLeft = pucRef + (iY * iWidth);
        for(iX = iLeft; iX <= iRight; iX++) {
            /* Init temporal AD */
            iTmpAd = 0;
            /* Copy Left posision pointer */
            pucC = pucCurLeftTop;
            pucR = pucRefLeft + iX;
            /* Get absoluete difference of current position */
            for(iV = 0; iV < 16; iV++) {
                for(iH = 0; iH < 16; iH++) {
                    iTmpAd += abs((INT32 )*(pucC++) -
                        (INT32)*(pucR++));
                }
                /* Current pointer down 1 line */
                pucC += iDown;
                pucR += iDown;
            }
            /* Check minimum AD */
            if(iMinAd > iTmpAd) {
```

Appendix

```
                iMinAd = iTmpAd;
                *piMvPos = iX;
                *(piMvPos+1) = iY;
            }
        }
    }
    return iMinAd;
```

6 SSE3 Intrinsics Code Example

```
pucRef = (pucRef + (iTop * iWidth) + iLeft);
pucC = pucCur + (iVpos * iWidth) + iHpos;
// Block loop
for(iY = 0; iY <= (iBottom – iTop); iY++){
    // Set start point for Reference window
    pucR = pucRef + iY * iWidth;
    for(iX = 0; iX <= (iRight – iLeft); iX++){
        sum = _mm_xor_si128(sum, sum);          // Clear accumulator
        sum2 = _mm_xor_si128(sum2, sum2);       // Clear accumulator
        // Get SAD for block pair
        row2 = _mm_lddqu_si128((__m128i *)pucR);
        row4 = _mm_lddqu_si128((__m128i *)(pucR + iWidth));
        row6 = _mm_lddqu_si128((__m128i *)(pucR + 2*iWidth));
        row8 = _mm_lddqu_si128((__m128i *)(pucR + 3*iWidth));
        row1 = _mm_load_si128((__m128i *) pucC);
        row3 = _mm_load_si128((__m128i *) (pucC + iWidth));
        row5 = _mm_load_si128((__m128i *) (pucC + 2*iWidth));
        row7 = _mm_load_si128((__m128i *) (pucC + 3*iWidth));
        row1 = _mm_sad_epu8(row1, row2);
        row3 = _mm_sad_epu8(row3, row4);
        sum = _mm_add_epi16(sum, row1);
        sum2 = _mm_add_epi16(sum2, row3);
        row5 = _mm_sad_epu8(row5, row6);
        row7 = _mm_sad_epu8(row7, row8);
        sum = _mm_add_epi16(sum, row5);
        sum2 = _mm_add_epi16(sum2, row7);
```

-continued

6 SSE3 Intrinsics Code Example

```
        row2 = _mm_lddqu_si128((__m128i *)(pucR + 4*iWidth));
        row4 = _mm_lddqu_si128((__m128i *)(pucR + 5*iWidth));
        row6 = _mm_lddqu_si128((__m128i *)(pucR + 6*iWidth));
        row8 = _mm_lddqu_si128((__m128i *)(pucR + 7*iWidth));
        row1 = _mm_load_si128((__m128i *) (pucC + 4*iWidth));
        row3 = _mm_load_si128((__m128i *) (pucC + 5*iWidth));
        row5 = _mm_load_si128((__m128i *) (pucC + 6*iWidth));
        row7 = _mm_load_si128((__m128i *) (pucC + 7*iWidth));
        row1 = _mm_sad_epu8(row1, row2);
        row3 = _mm_sad_epu8(row3, row4);
        sum = _mm_add_epi16(sum, row1);
        sum2 = _mm_add_epi16(sum2, row3);
        row5 = _mm_sad_epu8(row5, row6);
        row7 = _mm_sad_epu8(row7, row8);
        sum = _mm_add_epi16(sum, row5);
        sum2 = _mm_add_epi16(sum2, row7);
        row2 = _mm_lddqu_si128((__m128i *)(pucR + 8*iWidth));
        row4 = _mm_lddqu_si128((__m128i *)(pucR + 9*iWidth));
        row6 = _mm_lddqu_si128((__m128i *)(pucR + 10*iWidth));
        row8 = _mm_lddqu_si128((__m128i *)(pucR + 11*iWidth));
        row1 = _mm_load_si128((__m128i *) (pucC + 8*iWidth));
        row3 = _mm_load_si128((__m128i *) (pucC + 9*iWidth));
        row5 = _mm_load_si128((__m128i *) (pucC + 10*iWidth));
        row7 = _mm_load_si128((__m128i *) (pucC + 11*iWidth));
        row1 = _mm_sad_epu8(row1, row2);
        row3 = _mm_sad_epu8(row3, row4);
        sum = _mm_add_epi16(sum, row1);
        sum2 = _mm_add_epi16(sum2, row3);
        row5 = _mm_sad_epu8(row5, row6);
        row7 = _mm_sad_epu8(row7, row8);
        sum = _mm_add_epi16(sum, row5);
        sum2 = _mm_add_epi16(sum2, row7);
        row2 = _mm_lddqu_si128((__m128i *)(pucR + 12*iWidth));
        row4 = _mm_lddqu_si128((__m128i *)(pucR + 13*iWidth));
        row6 = _mm_lddqu_si128((__m128i *)(pucR + 14*iWidth));
        row8 = _mm_lddqu_si128((__m128i *)(pucR + 15*iWidth));
        row1 = _mm_load_si128((__m128i *) (pucC + 12*iWidth));
        row3 = _mm_load_si128((__m128i *) (pucC + 13*iWidth));
        row5 = _mm_load_si128((__m128i *) (pucC + 14*iWidth));
        row7 = _mm_load_si128((__m128i *) (pucC + 15*iWidth));
        row1 = _mm_sad_epu8(row1, row2);
        row3 = _mm_sad_epu8(row3, row4);
        sum = _mm_add_epi16(sum, row1);
        sum2 = _mm_add_epi16(sum2, row3);
        row5 = _mm_sad_epu8(row5, row6);
        row7 = _mm_sad_epu8(row7, row8);
        sum = _mm_add_epi16(sum, row5);
        sum2 = _mm_add_epi16(sum2, row7);
        sum = _mm_add_epi16(sum, sum2);
        tmp = _mm_srli_si128(sum, 8);
        sum = _mm_add_epi32(sum, tmp);
        // Check for new minimum SAD
        iTmpAd = _mm_cvtsi128_si32(sum);
```

-continued

6 SSE3 Intrinsics Code Example

```
        if(iTmpAd < iMinAd){
            iMinAd = iTmpAd;
            *piMvPos = iX + iLeft;
            *(piMvPos+1) = iY + iTop;
        }
        pucR++;
    }
}
return iMinAd;
}
```

Appendix A—Performance Data

Performance Data Revision History

| Revision | Revision History | Date |
|----------|------------------|------|
| 1.0 | Original publication of document | July 2003 |
| 2.0 | Update performance data | December 2003 |

TABLE 1

Performance Data of ME Implementations
Performance Data in Milliseconds

|  | Pentium 4 Processor (2.8 GHz) | Pentium 4 Processor with SSE3 (2.8 GHz) |
|---|---|---|
| SSE2 instructions | 5296 | 5156 |
| SSE3 instructions (lddqu) | — | 3750 |

TABLE 2

Speedups from Table 1 Performance Data

| Implementations and Platforms | Speedup |
|---|---|
| Pentium 4 processor (SSE3 vs. SSE2) | 1.37 |

Performance was measured using an Intel Pentium 4 2.8 GHz processor with SSE2 and an Intel Pentium 4 2.8GHz processor with SSE3. See Test Systems Configuration below for a detailed description of the test systems.

Test Systems Configuration

TABLE 3

Pentium 4 SSE2 Configuration

| Processor | Pentium 4 Processor at 2.8 GHz with SSE2 |
|---|---|
| System | Intel ® Desktop Board Springdale (Chelan - C23691-200) |
| Bios Version | VVPSGI5A.86A.0033.D.0304101021 |
| Secondary Cache | 512 KB |
| Memory Size | 512 MB DDR 333 MHz |
| Ultra ATA Storage Driver | Intel 5.0.10020 |
| Hard Disk | Maxtor 6L080J4 |
| Video Controller/Bus | ATI Radeon 9700 Pro - 128 MB |
| Video Driver Revision | 5.1.2600.0 |
| Operating System | Windows XP Professional 2002 SP1 |

TABLE 4

Pentium 4 SSE3 Configuration

| Processor | Pentium 4 Processor at 2.8 GHz with SSE3 |
|---|---|
| System | Intel ® Desktop Board Springdale (Chelan - C23691-200) |
| Bios Version | VVPSGI5A.86A.0033.D.0304101021 |
| Secondary Cache | 512 KB |
| Memory Size | 512 MB DDR 333 MHz |
| Ultra ATA Storage Driver | Intel 5.0.10020 |
| Hard Disk | Maxtor 6L080J4 |
| Video Controller/Bus | ATI Radeon 9700 Pro - 128 MB |
| Video Driver Revision | 5.1.2600.0 |
| Operating System | Windows XP Professional 2002 SP1 |

What is claimed is:

1. A computer system comprising:
a processor having a set of basic program execution registers, a set of floating point data registers, and a set of single instruction multiple data (SIMD) registers;
main memory having data stored therein to be accessed by the processor to implement a block matching algorithm of a video encoder, the main memory having stored therein a current pixel block from an image frame and a search area of another image frame; and
a cache accessible by the processor,
wherein the data causes the current block to be compared to a first pixel block of said search area, and then the current block is compared to a second pixel block of said search area, the second pixel block being the first pixel block shifted by a pixel, said shift causing a cache line split when loading the second pixel block from the cache into the set of SIMD registers,
wherein two different types of processor instructions are used in the data for the block matching algorithm to load pixel blocks from the main memory into the set of SIMD registers, a first type of instruction being used when Loading pixel block data items that are aligned with a cache line boundary of the cache, and a second type of instruction being used when loading pixel block data items that are unaligned with the cache line boundary,
the first type of instruction on causes data being loaded from the cache to the set of SIMD registers to be processed by a higher Latency function block than that used by the second type of instruction.

2. The system of claim 1 wherein the second type of instruction specifies (1) a load request address of a 128-bit operand that is not aligned to a 16-byte boundary, and (2) a SIMD register to be loaded with the operand.

3. The system of claim 2 wherein the processor is to execute the second type of instruction by loading a 32-byte block starting at a 16-byte aligned address immediately below the load request address, and then extract from the loaded 32-byte block the 128-bit operand.

4. The system of claim 3 wherein the processor is to extract the 128-bit operand by shifting portions of the loaded 32-byte block using a shifter of a floating point unit of the processor.

5. The system of claim 4 further comprising a decoder to decode digital video in a format output by a camcorder into said image frame and said another image frame.

6. The system of claim 4 further comprising a decoder to decode compressed digital video into said image frame and said another image frame.

7. A method comprising:
comparing, by a computer processor, a current pixel block from an image frame to a first pixel block of a search area of another image frame, and then comparing the current pixel block from the image frame to a second pixel block of said search area, the second pixel block being the first pixel block shifted by a pixel, said shift causing a cache line split when loading the second pixel block from a cache into a set of single instruction multiple data (SIMD) registers, wherein two different types of processor instructions are used to load pixel blocks from main memory into the set of SIMD registers, a first type of instruction being used when loading pixel block data items that are aligned with a cache line boundary of the cache, and a second type of instruction being used when loading pixel block data items that are unaligned with the cache line boundary, the first type of instruction causes data being loaded from the cache to the set of SIMD registers to be processed by a higher latency function block than that used by the second type of instruction.

8. The method of claim 7 wherein the second type of instruction specifies (1) a load request address of a L28-bit operand that is not aligned to a 16-byte boundary, and (2) a SIMD register to be loaded with the operand.

9. The method of claim 8, further comprising:
executing the second type of instruction by loading a 32-byte block starting at a 16-byte aligned address immediately below the load request address, and then extracting from the loaded 32-byte block the 128-bit operand.

10. The method of claim 9, further comprising:
extracting the 128-bit operand by shifting portions of the loaded 32-byte block using a shifter of a floating point unit of the computer processor.

11. The method of claim 10, further comprising:
decoding digital video in a format output by a camcorder into said image frame and said another image frame.

12. The method of claim 10, further comprising:
decoding compressed digital video into said image frame and said another image frame.

* * * * *